UNITED STATES PATENT OFFICE.

HENRY CHARLES STIEFEL, OF PITTSBURGH, PENNSYLVANIA.

FOOD COMPOUND.

1,056,603.   Specification of Letters Patent.   Patented Mar. 18, 1913.

No Drawing.   Application filed September 30, 1912. Serial No. 722,112.

*To all whom it may concern:*

Be it known that I, HENRY CHARLES STIEFEL, a citizen of the United States of America, residing at Pittsburgh, in the county of Allegheny and State of Pennsylvania, have invented certain new and useful Improvements in Food Compounds, of which the following is a specification.

This invention relates to a food compound to be used as an artificial grit for poultry.

Ordinary grit, in the form of crushed oyster shells or ground bone, fed to poultry serves a double purpose of providing a grinding material to reduce the whole grains eaten by fowls to a fine state in the bird's craw, and to provide lime and phosphorus to produce egg-shells and build up and strengthen the bones of birds.

In using these materials there is a drawback to the use of oyster shells alone, insomuch that the product provides the growing fowl with but one needed mineral salt, viz., lime. If ground bone is used to add phosphorus to the grit its unsanitary condition due to adhering, decaying organic substances is frequently the cause of disease.

The object of my invention is to produce a sanitary grit free from the above mentioned defects containing lime, phosphorus, and basic open hearth slag in such proportions as are beneficial to the growth and egg producing qualities of a fowl.

My compound comprises the following ingredients in the proportions stated, viz:—

Ground phosphate rock___ 10 parts
Basic open hearth slag___ 10 parts
Lime _____ 5 parts The phosphate rock used contains approximately 60% phosphate of lime and this rock is ground. The basic open hearth slag contains approximately $SiO_2$—19—15, $MnO$—11—9, $CaO$—42—39, $FeO$—13—20, and $P_2O_5$—5—2 in combination. Burnt lime or its equivalent in limestone is used. These three ingredients are ground to a fine powder and are thoroughly mingled by agitation. The mixture is then melted to a slag. This slag is then crushed to a suitable size, either to a coarse powder or to uniform granular size, for instance, the size of a pea.

From the foregoing it will be observed that I have devised a sanitary, tonic grit or food compound that contains those ingredients essential to the growth and egg producing qualifications of fowls, and I desire it to be understood that the proportions of the ingredients can be varied to meet with the requirements of certain conditions.

I reserve the right to use the compound as a fertilizer or for other purposes than herein specified.

I claim:—

1. The herein described food compound consisting of phosphate rock, basic open hearth slag and lime.

2. The herein described food compound for fowls, consisting of 10 parts phosphate rock, 10 parts basic open hearth slag and 5 parts of lime.

3. The herein described food compound for fowls, consisting of a granular mixture of phosphate rock, basic open hearth slag and lime.

4. The herein described food compound for fowls, consisting of a granular mixture of 10 parts phosphate rock, 10 parts basic open hearth slag and 5 parts of lime.

In testimony whereof I affix my signature in the presence of two witnesses.

HENRY CHARLES STIEFEL.

Witnesses:
  MAX H. SROLOVITZ,
  KATHERINE ERRETT.